United States Patent
Lingamneni

(10) Patent No.: US 9,501,518 B2
(45) Date of Patent: *Nov. 22, 2016

(54) SYSTEMS AND METHODS FOR INTERVAL CONTROL ELEMENT CHAIN ARCHITECTURE

(71) Applicant: American Express Travel Related Services Company, Inc., New York, NY (US)

(72) Inventor: Krishna K. Lingamneni, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 349 days.

This patent is subject to a terminal disclaimer.

(21) Appl. No.: 14/188,730

(22) Filed: Feb. 25, 2014

(65) Prior Publication Data

US 2014/0172777 A1  Jun. 19, 2014

Related U.S. Application Data

(63) Continuation of application No. 13/400,877, filed on Feb. 21, 2012, now Pat. No. 8,694,461.

(51) Int. Cl.
*G06F 7/00* (2006.01)
*G06F 17/30* (2006.01)

(52) U.S. Cl.
CPC ..... *G06F 17/30386* (2013.01); *G06F 17/3048* (2013.01); *G06F 17/30563* (2013.01)

(58) Field of Classification Search
CPC ................... G06F 17/30563; G06F 17/30386; G06F 17/3048
See application file for complete search history.

(56) References Cited

U.S. PATENT DOCUMENTS

| | | | |
|---|---|---|---|
| 5,893,114 A | 4/1999 | Hashimoto et al. | |
| 7,444,342 B1 | 10/2008 | Hall et al. | |
| 2003/0018605 A1 | 1/2003 | Policastro et al. | |
| 2003/0200209 A1 | 10/2003 | Smith et al. | |
| 2004/0046793 A1 | 3/2004 | Tanaka et al. | |
| 2005/0071348 A1 | 3/2005 | Laicher et al. | |
| 2005/0086360 A1 | 4/2005 | Mamou et al. | |
| 2006/0112173 A1 | 5/2006 | Cohn et al. | |
| 2007/0244918 A1 | 10/2007 | Lee et al. | |
| 2008/0104133 A1 | 5/2008 | Chellappa et al. | |
| 2009/0037489 A1* | 2/2009 | Grundler | G06Q 10/10 |
| 2009/0063319 A1* | 3/2009 | Bharucha | G06Q 20/10 705/35 |

FOREIGN PATENT DOCUMENTS

EP  1956543  8/2008

OTHER PUBLICATIONS

USPTO; Office Action dated Mar. 25, 2013 in U.S. Appl. No. 13/400,877.
USPTO; Final Office Action dated Jul. 22, 2013 in U.S. Appl. No. 13/400,877.
USPTO; Advisory Action dated Nov. 1, 2013 in U.S. Appl. No. 13/400,877.
USPTO; Notice of Allowance dated Jan. 15, 2014 in U.S. Appl. No. 13/400,877.

* cited by examiner

*Primary Examiner* — Charles Lu
(74) *Attorney, Agent, or Firm* — Snell & Wilmer L.L.P.

(57) ABSTRACT

This disclosure relates to improving the efficiency and quality of real-time extracting, transforming, and/or loading data using customer information control system (CICS) interval control element (ICE) chain processing.

17 Claims, 4 Drawing Sheets

SYSTEMS AND METHODS FOR INTERVAL CONTROL ELEMENT CHAIN ARCHITECTURE

CROSS-REFERENCE TO RELATED APPLICATIONS

This application is a continuation of, claims priority to and the benefit of, U.S. Ser. No. 13/400,877 filed Feb. 21, 2012 and entitled "SYSTEMS AND METHODS FOR INTERVAL CONTROL ELEMENT CHAIN ARCHITECTURE," which is incorporated herein by reference in its entirety.

FIELD OF DISCLOSURE

The present disclosure generally relates to accessing data, and more particularly, to systems and methods for improving the efficiency and quality of real-time extracting, transforming, and/or loading data using customer information control system (CICS) interval control element (ICE) chain processing.

BACKGROUND OF THE DISCLOSURE

Despite innovations leading to more robust and efficient computing systems and software, the role of mainframe computing remains vital to many businesses and organizations. In most cases, mainframe computing systems that are in use today were originally implemented prior to the computing innovations of the 1980's and 1990's. However, many businesses and organizations have concluded that it would be too expensive and too intrusive to day-to-day business operations to upgrade their major systems to newer technologies. Therefore, to enable continued expansion of computing infrastructures to take advantage of newer technologies, much effort has been devoted to developing ways to integrate older mainframe technologies with newer server and component based technologies. For instance, COBOL is one of the oldest programming languages. It is a legacy language in use by many organizations. Its name is an acronym for Common Business-Oriented Language, defining its primary domain in business, finance, and administrative systems for companies and governments.

A Customer Information Control System (CICS) may be an online transaction processing (OLTP) program created by IBM that, together with the COBOL programming language, has formed over the past several decades the most common set of tools for building customer transaction applications in the world of large enterprise mainframe computing. A great number of the legacy applications still in use are COBOL/CICS applications.

However, the strains on these legacy systems has increased as users demand more processing and take advantage of new tools, such as connecting to the system via the Internet. Users are demanding near real-time information and legacy systems have failed to meet the near-real time threshold of data availability. Therefore, a need exists for a system and method for increasing computing efficiency, reliability and speed within a mainframe environment.

SUMMARY OF THE DISCLOSURE

These above disclosed needs are successfully met via the disclosed system and method. For instance, using this system, data is available in a consumption ready format through a highly available cache. In one embodiment, the CICS ICE Chain Processing may be leveraged to extract data from a database table, such as one or more DB2 tables. Transformation logic may be executed to create the consumption ready data, for instance based on business rules. The consumption ready data may be loaded into a cache, such as a cache on a dedicated mainframe (e.g., a Z10 Mainframe). This cached data may contain any information pertinent to the business activities. This cached data system of the current architecture is designed to provide 99.99% availability of data to its interfaces and users. Most importantly, the response time is around 12 times faster than the older MQ servicing architecture.

In various embodiments, the present system discloses reusing application code for the extract and transformation purposes, and integrating this code with the ICE Chain process/architecture. This ICE Chain process may manage the Load portion of the ETL through the DB2 remote DRDA Database Update, Delete, and Insert processing.

In various embodiments, a system, method or article of manufacture for data retrieval may include a processor configured to create a load module, a tangible, non-transitory memory configured to communicate with the processor, the tangible, non-transitory memory having instructions stored thereon that, in response to execution by the processor, cause the processor to perform operations comprising: writing a change record to a master change table, monitoring the master change table by a master ICE Chain, allocating among child change tables with associated child ICE Chains a portion of an extract task using a master ICE Chain application, executing for each child ICE Chain an application service program to capture data from a plurality of databases, and performing application transformation logic to create a consumption ready record. In various embodiments, the application service program executed may be particular to the task for each portion of the extract task. The executing of the application service program to capture data from the plurality of databases may be performed according to business rules. In various embodiments, the application transformation logic may be performing computations and/or formatting. The consumption ready record data is available without requiring additional computations. This consumption ready record may be written to a cache table.

In various embodiments, a timestamp is associated with each writing to the master change table. The system may be reset to any timestamp. ICE Chain application programs may be configured to run at a predetermined interval and/or in response to a measured event Furthermore, in various embodiments, ICE Chain application programs can link to any another program stored on a mainframe. Various programs described herein, such as an ICE Chain application program, may be coded in COBOL. In response to a transformation occurring or an ICE Chain program being run, denormalization may be performed.

BRIEF DESCRIPTION OF THE DRAWINGS

A more complete understanding of the present disclosure may be derived by referring to the detailed description and claims when considered in connection with the Figures and Tables, wherein like reference numbers refer to similar elements throughout the Figures, and:

DETAILED DESCRIPTION

Figure 1:
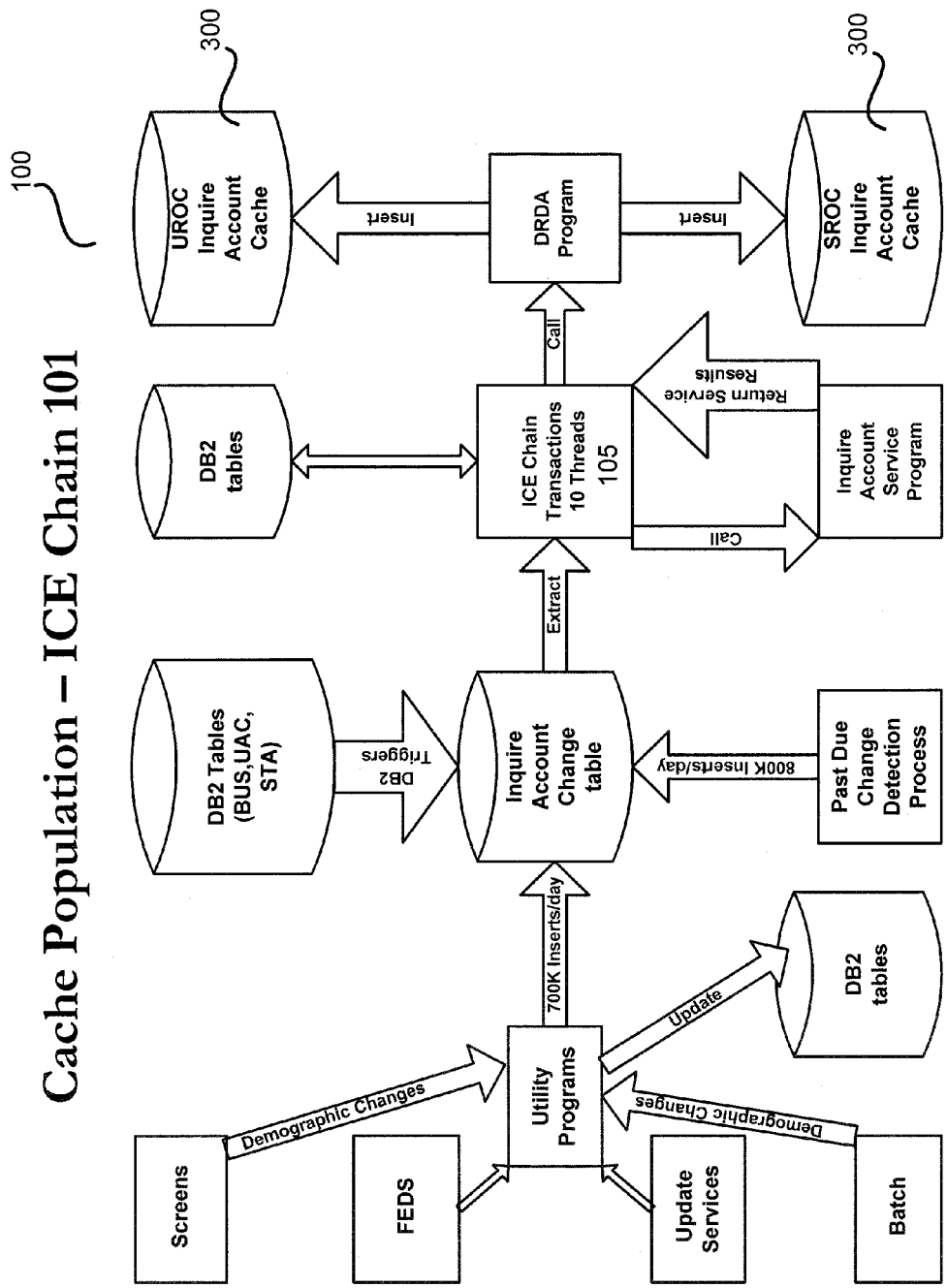
FIG. 1 is a combination block diagram and flowchart illustrating an exemplary architecture for ICE Chain and implementation, according to various embodiments of the present disclosure.

The detailed description of various exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In general, the system disclosed herein reduces response time, CPU cost, and improves the availability of requests to mainframe services to 99.99%. Legacy systems were designed to access multiple database tables to assemble a response to user requests. Thus, consumption ready data was not possible as multiple back end processes were needed prior to the data being current and ready for consumption. Stated another way, using the present system a user may make a request (e.g., a request for an account balance), and the present system is able to deliver the (substantially) real-time current account balance from the pre-stored cache, without the need to perform additional computations in response to the user request. This is due to the changes to the account being pre-populated in response to the changes to the account occurring and being received by the transaction account issuer system.

Moreover, using legacy systems accessing multiple DB2 tables and formatting the reply messages required high CPU consumption and unacceptable response time. Unlike legacy systems, in various embodiments, the data is de-normalized and the final response is stored in the DB2 Cache in a consumption ready format. The cache may be updated in a near real-time fashion using an Extract, Transform, Load (ETL) method, leveraging a CICS ICE Chain 100 (Interval Control Element).

In various embodiments, in response to a change occurring at a database, a change record is written into a Master DB2 Change table 200 that captures the account code for the accounts changing. In various embodiments, the change may be a user, such as a transaction account holder, updating their demographic information on a transaction account issuer website. The transaction account holder may have an account code associated with at least one transaction account.

The Master change table may be monitored by a Master ICE Chain 101. The Master ICE Chain 101 distributes the change records into multiple Child DB2 Change tables 205. A dedicated Child ICE Chain 105 is allocated to process the requests from a Child DB2 Change table 205. The dedicated Child ICE Chain 105 executes an Application Service Program which extracts the data (e.g., demographic, financial or transaction detail information) from various application DB2 tables, and then perform the application transformation logic such as performing computations and formatting to create a consumption ready record. The Child ICE Chain 105 may insert the final consumption ready record into the Cache table 300 ready for consumption. The Load portion of the ETL is processed by the Child ICE Chains 105 which update the DB2 Cache table 300 using the Insert, Delete and Update structured query language (SQL) operations via DB2 remote Distributed Relational Database Architecture (DRDA). The Cache table 300 may be available on a highly available mainframe, such as a Z DB2 mainframe. When the interfaces and/or user inquire regarding user/customer data, the data is exposed via the SQL stored procedures. The SQL stored procedures will leverage a special purpose processor, as a zIIP engine, to reduce third party CPU costs, for instance for processing the I/O, and expose the responses in near real-time, such as substantially real-time.

In contrast to legacy ETL tools, where integration of the complex transformation logic into the legacy ETL tool is difficult, applications of the current system, which may be coded in any suitable computer language, such as COBOL, may be integrated easily into the ICE Chain 100 ETL processing. Typically, the integration of the transformation performed in the COBOL modules cannot be integrated with the other legacy ETL tools with ease. For instance, separate transformation processes must be created for the legacy ETL tools. These multiple disparate transformation programs required maintenance which increases IT costs to an organization.

With the ICE Chain 100 ETL processing of the current disclosure, the development and maintenance cost of the transformation programs is minimal as it can reuse the existing transformation programs, such as other COBOL programs, used for other channels. In the rare case where the data is corrupted on the destination site, data recovery may be accomplished with minimal difficulty. The spawning of the threads (detailed below) can be controlled more effectively and tuned according to the requirements to achieve greater throughput.

In contrast to the presently described system, legacy ETL tools do not have interfaces to execute COBOL application modules for the transformation of data. Also, in contrast to the presently described system, legacy ETL tools could not execute a preexisting existing transformation module residing on the mainframe. In addition, the ICE Chain 100 ETL tool uses a proprietary spawning mechanism to perform the ideal thread management to replicate data changes in a near real-time (substantially in real time) fashion to the cache platform.

The CICS ICE Chain 100 ETL tool can easily couple with existing COBOL application programs that perform the Extract and the Transformation pieces of a replication. In various embodiments, an application may have one COBOL utility program module that can perform the application logic to transform, compute, format, access, and update a database. This way, an application system can maintain just one program that can be used by multiple channels such as the Batch processes, On-line screens, and the MQ Services. The same application program can be coupled with the ICE Chain 100 for performing the Extract and Transform actions of the ETL process. Thus, the development costs of the Extract and Transform actions can be reduced and/or minimal. Also, the complex application logic may be maintained in one spot, which may be leveraged by the CICS ICE Chain 100 tool to perform the Extract and Transform with minimal complexity. In the other legacy ETL tools, one would need to create the Extract and Transform logic in the legacy ETL tool, and create the Extract and Transform logic in the application. This duplication creates unnecessary complexity and using additional time.

In various embodiments, the ICE Chain 100 ETL tool is configured to use dedicated Change tables 200 for the Child ICE Chain 105 threads. This way, the threads do not lock each other out and there is minimal contention. In various embodiments, the number of ICE Chain 100 threads servicing the ETL process can be regulated on the basis of the number of requests flowing through the system. For instance, depending on the arrival rate of the requests, more ICE Chain 105 threads may be spawned. In various embodiments, the ratio between the number of ICE Chain 105 threads needed, and the number of pending requests to be processed may be maintained in a control table 200. The Master ICE Chain 101 may monitor the Master Change table 200, and spawn more Child ICE Chain 105 threads in response to the requests pending to be processed in the Change table 200, number of threads running in the system, and/or the number of threads needed to process in a near real time fashion as defined in a Control table 210.

If the ETL process goes wrong and the destination data is corrupted, it is very easy to reprocess the requests by changing the timestamp to an error-free timestamp occurrence. The Master ICE Chain 101 copies the Change records from the Parent Change table 201 to Child Change tables 205 in response to the timestamp which is maintained in the Control table 210. In response to a recovery being needed, the timestamp may be changed back to an earlier in time timestamp, for example, a timestamp associated with valid data. The Parent ICE Chain 101 will restart the process from a back dated timestamp and copy the older records back onto the Child Change tables 205 and the Child ICE Chains 105 will reprocess the data.

The present system assists with reducing the development cost and/or reducing the time to market duration. This will also help in reducing the operational costs, and reducing the complexity of the transformation as it can be one source module to be reused by multiple avenues.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or various embodiments combining aspects of both software and hardware. Furthermore, the system may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

In the Figures, the process flows depicted are merely embodiments and are not intended to limit the scope of the disclosure. For example, the steps recited in any of the method or process descriptions may be executed in any order and are not limited to the order presented. Referring to FIG. 1, a combination block diagram and flowchart illustrating an exemplary architecture for ICE Chain 100 and implementation according to various embodiments of the present disclosure is depicted. FIG. 1 depicts, front end programs and back end systems interacting with various databases to result in changes being populated through the system to the caching platform.

Figure 2:
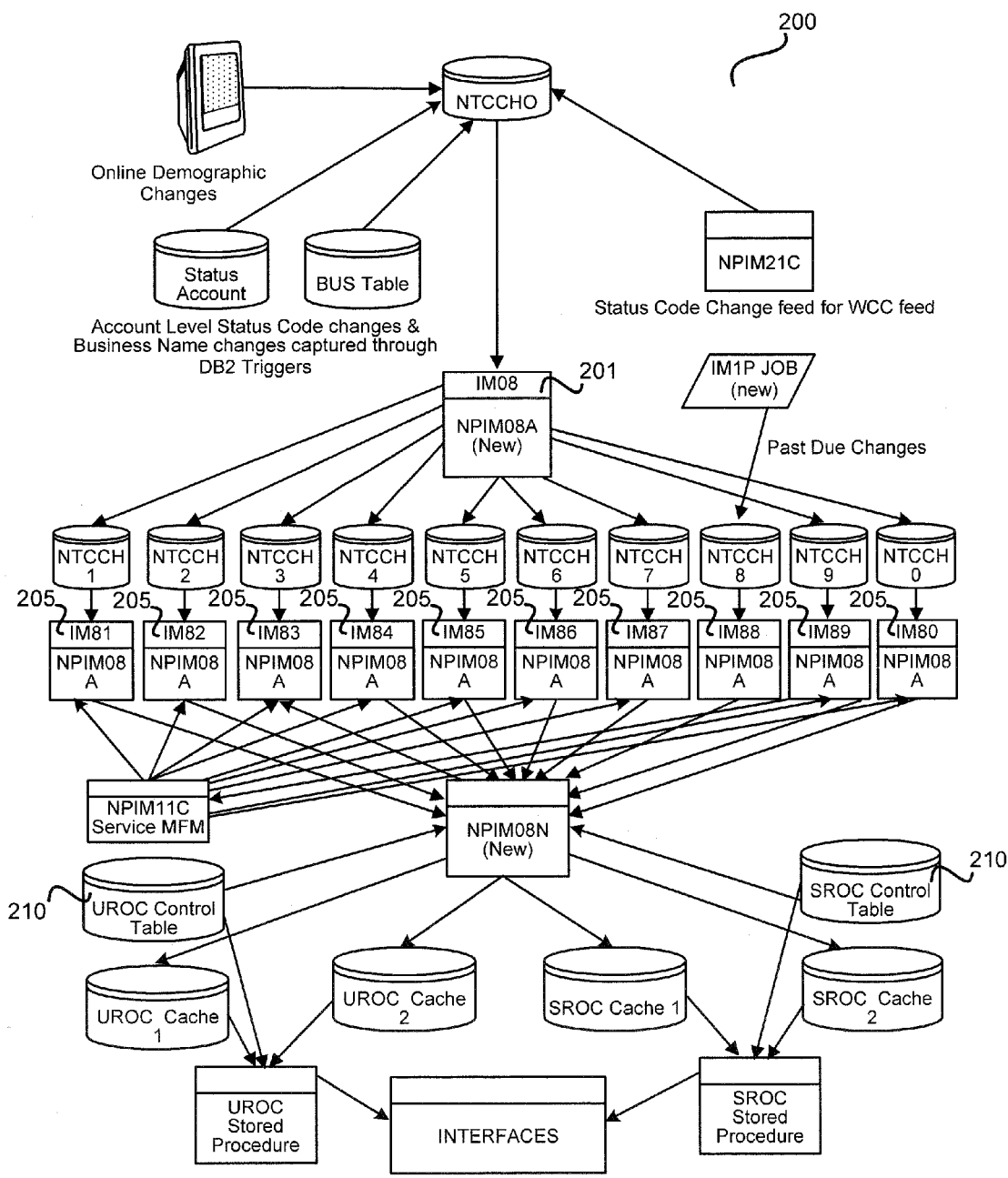
FIGS. 2-4 are flowcharts illustrating exemplary back end implementation, according to various embodiments of the present disclosure.
Figure 3:
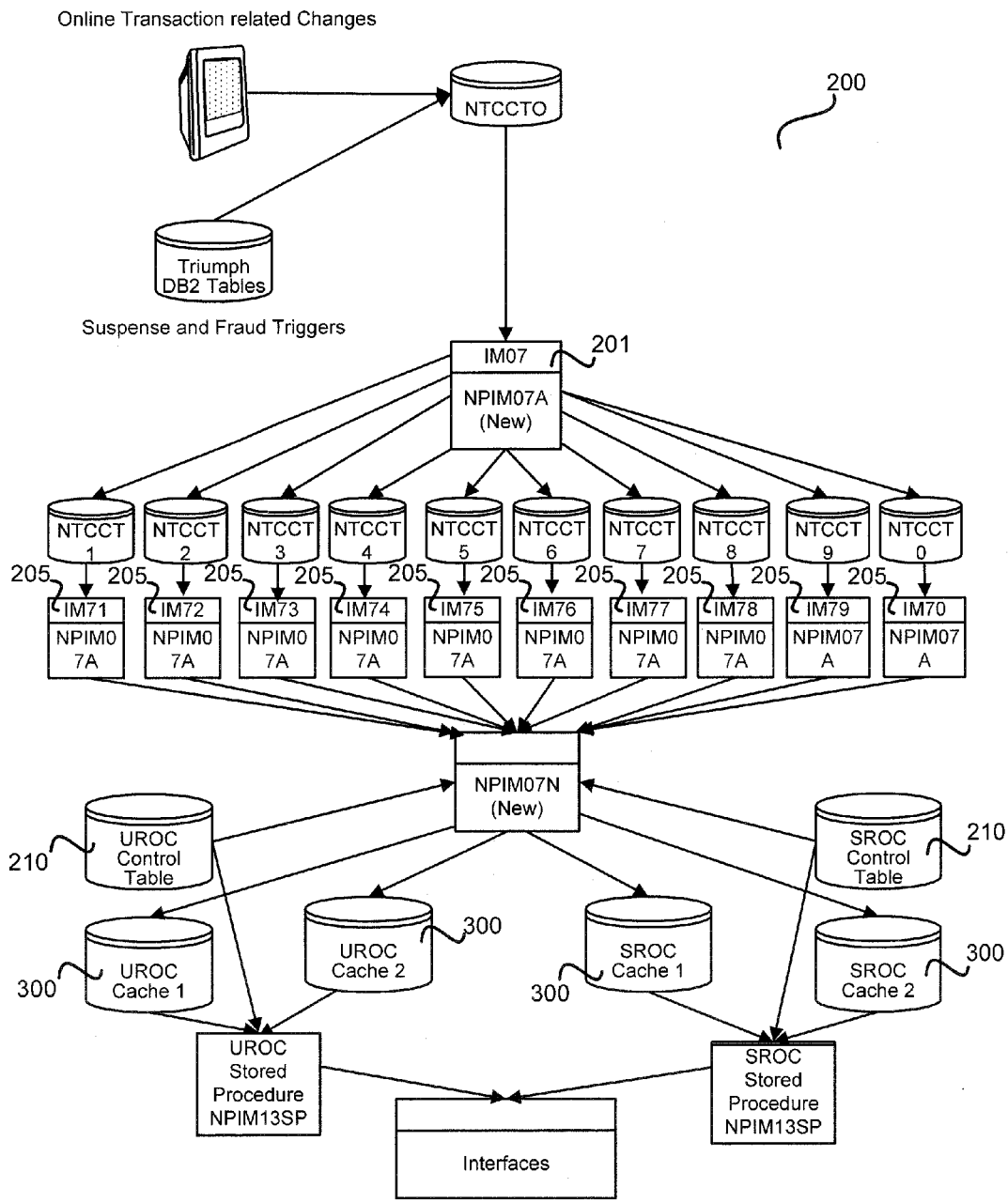
Figure 4:
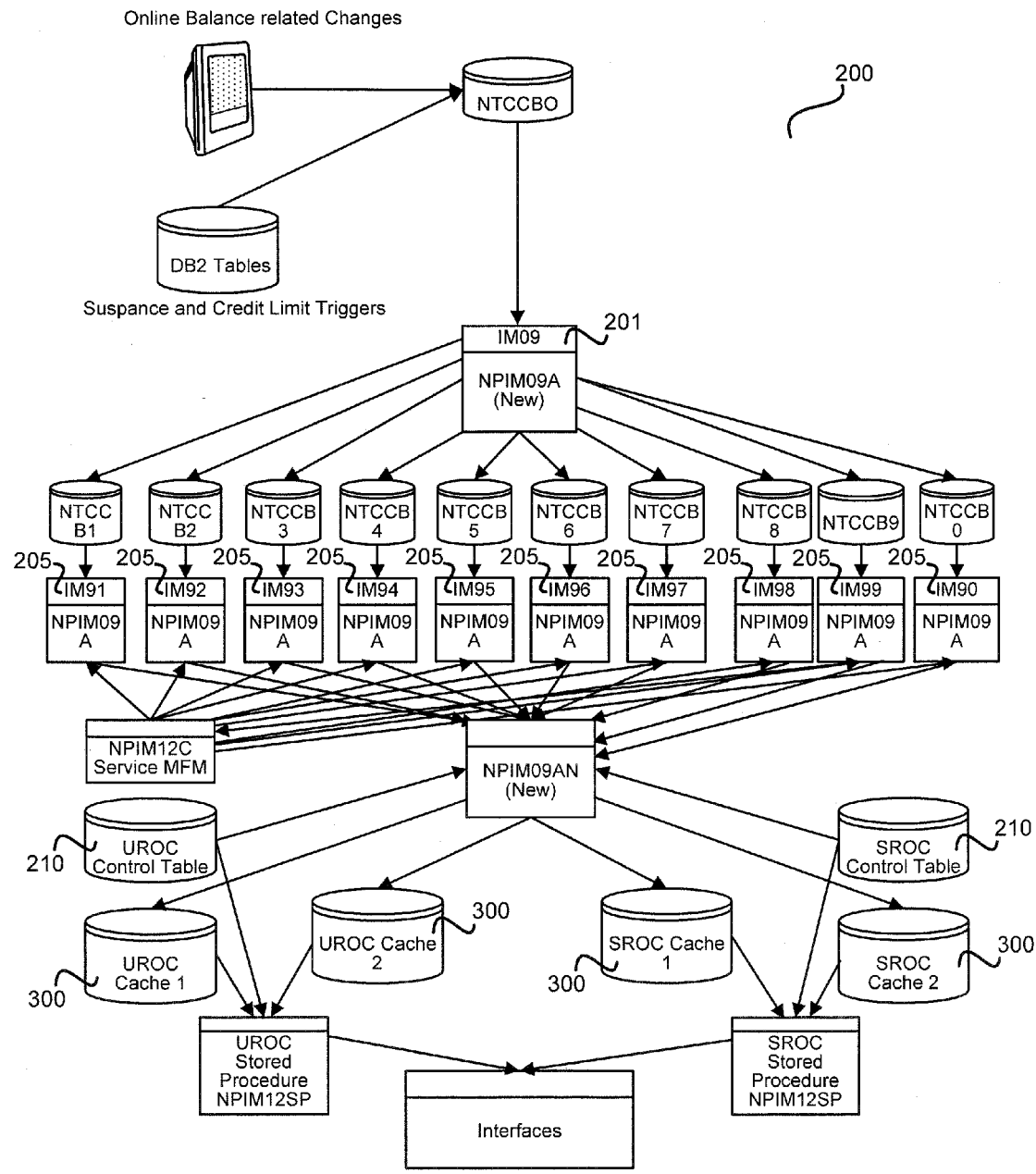

FIGS. 2-4 depict exemplary DB2 tables using the ICE Chain 100 methodology/architecture to perform an identified data replication through the system to the caching platform. Referring to FIG. 2, a Master Change table 201 is depicted (IM08). Master change table 201 IM08 parses the entries from the master change table in a plurality of child change tables 205, IM80-IM89. These change tables 201, 205 may interface with various databases NTCCH0-NTCCH9. There may be an associated Master ICE Chain 101 or child ICE chain 105 corresponding to each change table entry. In various embodiments, a redundant/backup caching platform and/or control table are created.

Referring to FIG. 3, similar to the description of FIG. 2, a Master change table 201 is depicted (IM07). IM07 parses the entries from the Master change table 201 in a plurality of child change tables 205, IM70-IM79. These change tables may interface with various databases NTCCT0-NTCCT9. There may be an associated master ICE Chain 101 or child ICE Chain 105 corresponding to each change table 200 entry. In various embodiments, a redundant/backup caching platform and/or control table 210 are created.

Referring to FIG. 4, similar to the description of FIGS. 2 and 3, a master change table 201 is depicted (IM09). IM09 parses the entries from the master change table 201 in a plurality of child change tables 205, IM90-IM99. These change tables may interface with various databases NTCCB0-NTCCB9. There may be an associated child ICE Chain 105 or master ICE Chain 101 corresponding to each change table entry. In various embodiments, a redundant/backup caching platform and/or control table 210 are created.

By way of summary, the interval control element chain 100 processing system is a real-time extracting, transforming, and/or loading data (customer information control system) tool. The ICE Chain 100 application program is configured to run at a predetermined interval and/or in response to an event. For instance, in a transaction account issuer environment, as data changes to transaction accounts are received by the transaction account issuer system data is changed on one or more database tables. The ICE Chain 100 application program captures/extracts this data and populates it to a consumption record. An ICE Chain 100 application program may be created for any type of change to the system. For instance, a separate ICE Chain 100 application program may exist for capturing changes to a transaction database, new account database, demographic database, balance database, fraud database, payment database, etc. Based on the particular ICE Chain 100 associated with the type of change to the system, a respective application table is accessed. Associated data is pulled from the respective application table and specified business rules are applied. Thus, the ICE Chain 100 calls a respective application program which performs a transformation. In response to the transformation being complete, denormalization is performed. The transformed records are transmitted over through a Distributed Relational Database Architecture (DRDA) to a caching platform and then loaded to the caching platform. Thus, these records are available to a user and are consumption ready. For instance, these records are available to a user and are consumption ready without the need for additional database table record calls.

In various embodiments, a master control table 201 and master ICE Chain 101 determines the number of spawned child ICE Chains 105 which may be needed to efficiently populate a change to the system to the caching platform. For instance, volume of changes may be used to determine the number of spawned child ICE Chains 105 needed. Also, to avoid the concern of contention of multiple simultaneous changes to the system a master controls table various spawned child ICE Chains 105.

In various embodiments, the system (e.g., the master control table 201) determines if the transfer desires an ICE Chain 100. In various embodiments, a high-volume, low-latency replication solution between source and target databases or subsystems, such as Q replicator, may be used to perform the transformation in lieu of an ICE Chain 100. This process may be implemented in response to a change being detected that does not involve heavy data manipulation. For instance, in the case of a single record being moved with no manipulation or formatting. Furthermore, in various embodiments, a third party ETL may perform a portion of a extract, transfer and load as determined by the system according transformation rules or business rules while ICE Chains 100 are utilized for the remaining portions.

Moreover, the master ICE Chain 101 can replay changes back to a specified period, for instance within two days using time stamps associated with the particular ETL. The master ICE Chain 101 saves and/or does not delete any of the records of ETLs performed for a pre-determined period. If needed, all records may be redistributed back into the tables and re-run based on a time stamp for recovery.

For instance, and with reference to FIG. 2, for a change that happens across the system, a change record may be written into the control table 210. That control table 210 may determine how many threads (105) are active and that each thread has its own control table 210. Each thread may have its own table of requests that it is configured to complete. Each control table 210 is associated with an ICE Chain 100. Each ICE Chain 100 may call upon an application transformation program to complete the requisite transformation. Each application transformation program may be unique depending on the transformation type being accomplished and have its own transformation rules or business rules dictating the transformation.

The ICE Chain 100 application program itself can link to any other program in the mainframe resulting in enhanced scalability and reusability, reducing time to market. For instance, an application transformation program may be called from a back office, from an online office, and/or from an ICE Chain 100 for an extract, transform load, all in one central place.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

The system and method is described herein with reference to block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. §101.

The invention claimed is:
1. A system comprising:
a data retrieval processor,
a tangible, non-transitory memory configured to communicate with the processor,
the tangible, non-transitory memory having instructions stored thereon that, in response to execution by the processor, cause the processor to perform operations comprising:
allocating, by the processor, among child change tables with associated child interval control element (ICE) Chains a portion of an extract task using a master ICE Chain application,
wherein a master change table is monitored by a master ICE Chain, and
wherein the master change table includes a change record;

executing, by the processor and in response to the allocating, for each child ICE Chain, an application service program that captures data from a plurality of databases; and creating, by the processor and in response to the executing, a consumption ready record, wherein the consumption ready record is written to a cache table, wherein requests for information associated with the change record are available for retrieval without additional computation, wherein changes to the consumption ready record are populated as current data, in response to changes to the data related to an associated account occurring and being received by a transaction account issuer system, and wherein responses to requests for calculations of the current data related to the associated account are available in substantially real-time, without the need to perform the calculations in the responses to the requests.

2. The system of claim 1, wherein the creating the consumption ready record further comprises performing application transformation logic.

3. The system of claim 1, wherein the master ICE Chain application is associated with a legacy Cobol programmed system.

4. The system of claim 1, wherein the data in the consumption ready record is available without requiring additional computations.

5. The system of claim 1, wherein the application service program executed is particular to a task for each portion of the extract task.

6. The system of claim 1, further comprising writing, by the processor, the change record to the master change table.

7. The system of claim 1, wherein responses to requests for calculations of the current data related to the associated account are available in substantially real-time.

8. The system of claim 1, wherein the executing of the application service program to capture the data from the plurality of databases is performed according to business rules.

9. The system of claim 1, wherein the application transformation logic further comprises at least one of performing computations or formatting.

10. The system of claim 1, wherein a timestamp is associated with each writing to the master change table.

11. The system of claim 1, wherein the system may be reset to any timestamp.

12. The system of claim 1, wherein the master ICE Chain application program is configured to run at least one of at a predetermined interval or in response to a measured event.

13. The system of claim 1, wherein in response to a transformation occurring, denormalization is performed.

14. The system of claim 1, further comprising employing a third party application to perform a portion of at least one of an extraction, a transformation or a load.

15. The system of claim 1, further comprising a spawning mechanism configured for thread management, wherein data changes are replicated substantially in real time.

16. An article of manufacture including a non-transitory, tangible computer readable storage medium having instructions stored thereon that, in response to execution by a computer-based data retrieval system, cause the computer-based system to perform operations comprising:

allocating, by the computer-based system, among child change tables with associated child interval control element (ICE) Chains a portion of an extract task using a master ICE Chain application, wherein a master change table is monitored by a master ICE Chain, and wherein the master change table includes a change record;

executing, by the computer-based system and in response to the allocating, for each child ICE Chain, an application service program that captures data from a plurality of databases; and creating, by the computer-based system and in response to the executing, a consumption ready record, wherein the consumption ready record is written to a cache table, wherein requests for information associated with the change record are available for retrieval without additional computation, wherein changes to the consumption ready record are populated as current data, in response to changes to the data related to an associated account occurring and being received by a transaction account issuer system, and wherein responses to requests for calculations of the current data related to the associated account are available in substantially real-time, without the need to perform the calculations in the responses to the requests.

17. A computer-implemented method comprising:

allocating, by a data retrieval computer-based system, among child change tables with associated child interval control element (ICE) Chains a portion of an extract task using a master ICE Chain application, wherein a master change table is monitored by a master ICE Chain, and wherein the master change table includes a change record;

executing, by the computer-based system and in response to the allocating, for each child ICE Chain, an application service program that captures data from a plurality of databases; and creating, by the computer-based system and in response to the executing, a consumption ready record, wherein the consumption ready record is written to a cache table, wherein requests for information associated with the change record are available for retrieval without additional computation, wherein changes to the consumption ready record are populated as current data, in response to changes to the data related to an associated account occurring and being received by a transaction account issuer system, and wherein responses to requests for calculations of the current data related to the associated account are available in substantially real-time, without the need to perform the calculations in the responses to the requests.

* * * * *